United States Patent [19]

Klink

[11] Patent Number: 4,522,290
[45] Date of Patent: Jun. 11, 1985

[54] FRICTIONAL LINING FOR A WET CLUTCH OR BRAKE

[75] Inventor: Rainer Klink, Kernen, Fed. Rep. of Germany

[73] Assignee: Deutsche Automobilgesellschaft mit beschrankter Haftung, Fed. Rep. of Germany

[21] Appl. No.: 442,126

[22] Filed: Nov. 16, 1982

[30] Foreign Application Priority Data

Nov. 20, 1981 [DE]  Fed. Rep. of Germany ....... 3145999

[51] Int. Cl.³ ............... F16D 13/62; F16D 13/72; F16D 43/18
[52] U.S. Cl. ............... 192/107 M; 188/251 A; 192/105 BA; 192/107 T; 192/113 B
[58] Field of Search ....... 192/107 M, 107 T, 105 BA, 192/113 B; 188/251 A

[56] References Cited

U.S. PATENT DOCUMENTS

| 445,247 | 1/1891 | Flohr | 192/107 T X |
|---|---|---|---|
| 508,663 | 11/1893 | Wakefield et al. | 192/107 T X |
| 539,833 | 5/1895 | Stone | 192/197 T X |
| 549,454 | 11/1895 | Lee | 192/107 T X |
| 1,073,685 | 9/1913 | Hoerl | 192/107 T X |
| 1,866,291 | 7/1932 | Bryson | 192/105 BA |
| 3,940,978 | 3/1976 | Akkerman et al. | 73/117 |
| 4,197,223 | 4/1980 | Bartrum | 188/251 A X |
| 4,383,596 | 5/1983 | Jackel | 192/105 BA X |

FOREIGN PATENT DOCUMENTS 547240  8/1942  United Kingdom ............ 192/113 B

OTHER PUBLICATIONS

"HDT-302 High Energy Friction Material for Power Shift Transmissions", prod. info. sheet; American Brake Shoe; three pages; 1966.

Primary Examiner—Rodney H. Bonck
Attorney, Agent, or Firm—Craig and Burns

[57] ABSTRACT

A frictional lining (2) for a wet clutch or brake includes a resin-free wood with an average raw density in the dried condition ($\delta$ o) of at least about 550 kilograms per cubic meter, the fibers of the wood running substantially parallel to the frictional direction of the clutch or brake. Elm wood is particularly suitable.

8 Claims, 3 Drawing Figures

FRICTIONAL LINING FOR A WET CLUTCH OR BRAKE

TECHNICAL FIELD

This invention concerns a frictional lining for a wet clutch or brake, in particular for a highly loaded centrifugal clutch.

BACKGROUND OF THE INVENTION

In the operation of centrifugal clutches, frictional linings are used which can sustain high mechanical and thermal loadings and suffer as little wear as possible in this process. These clutches are used in hydrodynamic torque converters as bridging clutches. See German Offenlegungsschrift No. 2,743,595. During extensive investigations of such centrifugal clutches, it has been found that frictional linings similar to those used, for example, in automotive vehicle transmissions, do not produce satisfactory results for differing reasons.

Semi-metal linings (asbestos/binder/metal chips), for example, have too much wear and, in addition, heavy rattling (stick-slip effect) occurs in the synchronization region.

The behavior of metal linings is substantially better regarding their ability to resist mechanical and thermal load. But, they are also subject to a slight stick-slip effect during the synchronization phase. The very low coefficient of sliding friction has also an unfavorable effect so that long slip periods can occur during certain operating conditions with an associated increase in heat release. One outstandingly favorable property of the metal lining, however, is that it has a lower coefficient of static friction with impact loading parallel to the friction surface compared with that found when the load increases steadily. This has the effect that in the event of a shock torque, which may be caused by a change of gear in an automatic transmission, the clutch opens briefly and the shock is thus reduced by the resulting slip. In the case of a steady or slowly increasing torque being applied, as during an acceleration phase for example, a higher torque can be transferred.

Paper linings (based on asbestos fiber with a binder and linings manufactured on paper machines) behave perfectly with respect to the stick-slip effect, as might be expected. In contrast to semi-metal and metal linings, they have the property that their coefficient of sliding friction is greater than their coefficient of static friction and this produces smooth and shock-free behaviour during the synchronization phase. Unfortunately, such frictional linings are not adequate to deal with the high energy and mechanical loads. When used in a centrifugal clutch, unfavorable irreversible changes soon occur to the properties of the lining.

Thus, there is a need to find a frictional lining for a wet clutch or brake, which combines the favorable properties of a paper lining with those of a metal lining. These favorable properties are rattle-free, smooth behavior in the synchronization phase, the ability to deal with high energy and mechanical loads, extremely small wear, high resistance to the liquids used in high performance transmissions (for example, ATF oils), higher coefficient of friction in the sliding phase before synchronization compared with that after synchronization has been completed and lower coefficient of friction with impact loads compared with that occurring under steady load after synchronization has been completed and lower coefficient of friction at high surface pressures. The present invention seeks to overcome the aforementioned disadvantages of prior art linings.

These and other objects, features and advantages of the present invention will become more apparent form the following description when taken in connection with the accompanying drawings which show, for purposes of illustration only, embodiments in accordance with the present invention.

SUMMARY OF THE INVENTION

Prior art problems are solved according to the present invention in that the frictional lining comprises resin-free wood whose fibers run substantially parallel to the frictional direction and whose average raw density $\delta o$ is at least about 550 kilograms per cubic meter.

During investigations of the centrifugal clutches of the type mentioned above, it was unexpectedly found that, using wood with steel as the sliding partner and ATF as the lubricant and coolant, there was an absolutely rattle-free behavior throughout the whole sliding range from contact of the centrifugal bodies to synchronization and the release from the attached condition due to excessive torque shocks.

The wood should be free of resin because, on the one hand, the resin prevents the penetration of the oil into the fibers and, on the other hand, undesirable changes in volume in the wood and pollution of the oil can occur when the resin emerges.

In order to obtain this condition, the resin can be removed from wood containing resin by conventional means. Short fiber wood is preferable as are deciduous woods. However, some long fiber wood, like coniferous woods including longleaf pine (Pinus palustris) are also suitable.

The wood should have high compressive and shear strength to resist surface pressures and shear forces. High resistance to wear is also necessary in order to make the wear as small as possible, or, indeed, to obviate it.

Both the strength figures and the resistance to wear increase with increasing raw density $\delta o$. Raw density $\delta o$ is the ratio of the mass of a wood specimen to its volume, which means the space enclosed by its external boundaries after drying at 103° C. until the weight remains constant. For this reason, it is advantageous to use wood with the highest raw density. On the other hand, it is, however, also advantageous if the structure of the wood is such that the fluid used for cooling and lubrication can penetrate well into the fiber structure. This latter requirement is fulfilled better by wood with a lower raw density.

Taking account of the somewhat opposing properties, the wood to be used as friction material must have an average raw density of at least about $\delta o = 550$ kilograms per cubic meter. A very good compromise with respect to the properties is provided by a wood with a raw density of approximately 600 to 660 kilograms per cubic meter. Wood with this raw density is preferred in practice.

It is also important for the manufacture of curved and thick linings that the wood can be easily bent. Examples of possible woods are larch (Larix), maple (Acer), birch (Betula), oak (Quercus sessiliflora), eucalyptus, hickory (Hicoria), nut (Juglans regia) and teak (Tectona grandis) together with ash (Fraxinus) and elm (Ulmus campestris). Elm has particularly advantageous behavior.

BEST MODE FOR CARRYING OUT THE INVENTION

Figure 1:
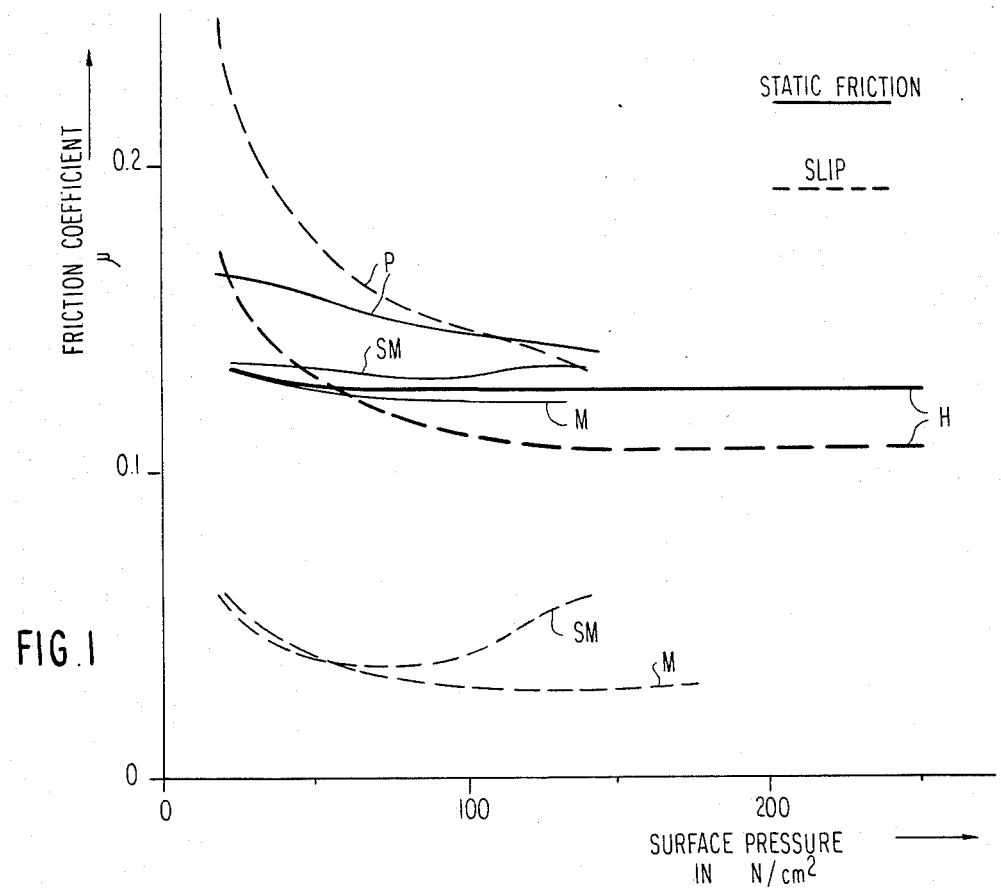
FIG. 1 shows the curve of the coefficient of friction for various frictional linings.

FIG. 1 shows the variation of the coefficients of friction of various frictional linings as a function of the surface pressure and with the rotational speed slip as parameter. The full line curves correspond to the coefficients of static friction and the dash line curves correspond to the coefficients of sliding friction at 20% rotational speed slip.

The drawing show that elm wood H has a frictional behavior similar to that of a paper lining P. Up to a surface pressure of approximately 60N/cm$^2$, the coefficient of sliding friction of this wood is higher than its coefficient of static friction. Above this surface pressure this relationship reverses. The semi-metal lining SM and the metal lining M, on the other hand, show the friction behavior typical of solid bodies. Their coefficients of sliding friction are substantially smaller than their coefficients of static friction.

During comparative tests, in which surface pressures of up to 110N/cm$^2$ occurred with the paper lining and up to 150N/cm$^2$ with the wood lining combined with energy loadings of 550J/cm$^2$, it was discovered that the paper linings changed their originally fine-fiber porous structure after approximately 12 hours. They more or less agglomerate so that the favorable frictional properties mentioned above are lost and the typical solid body behavior appears instead.

However, the elm wood lining did not change its properties during the entire duration of the test which lasted approximately 100 hours. During the tests, surface pressures of up to 400N/cm$^2$ occurred in certain tests. In addition, there was no appearance of wear throughout the duration of the test. Comparative tests with ash wood showed that this wood was subject to slight wear but had favorable sliding properties compared to elm wood.

Due to the high coefficient of sliding friction of the wood lining, it is possible to use centrifugal bodies with smaller mass and stronger return springs. This has the effect of producing a steeper torque transmission curve Mf(n) for a centrifugal clutch with the consequence that it is subject to smaller slip range than in the case of clutches with semi-metal or metal linings through use of the effects of centrifugal force. For automatic vehicle transmissions, this means that lower contact forces are necessary. Thus, energy can be saved.

The high surface pressure which can be used without damage to the wood lining also permits smaller dimensions for linings. Reduced dimensions are enormously important in vehicle transmissions. Also, particularly important is the fact that wood linings can be made very thin. In the investigations mentioned above, the thickness of the lining was only 1.5 and 2.0 mm, which corresponds to a maximum of 1% when referred to the diameter at the frictional surface D which is the frictional diameter.

The fact that the manufacture of the linings is very simple and that the machining of wood raises no environmental problems compared to asbestos is very important. For very thin linings, veneer wood can be used.

Figure 2:
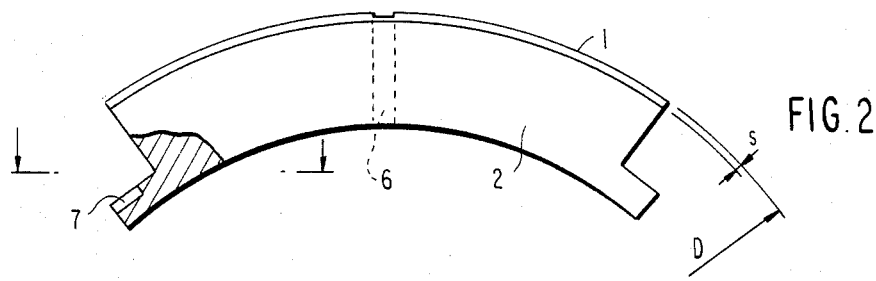
FIG. 2 shows the side view with a partial section broken away of a centrifugal body for a centrifugal clutch with glued-on wood lining.
Figure 3:
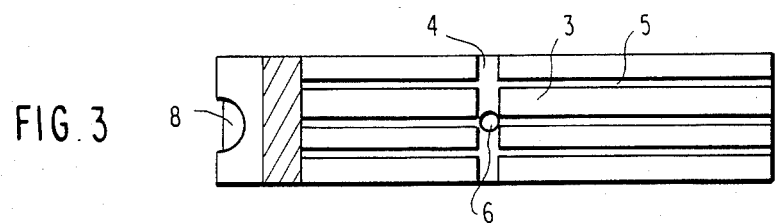
FIG. 3 shows the plan view with a portion cut away of a centrifugal body according to FIG. 2.

FIG. 2 and FIG. 3 illustrates features of the present invention by showing a wood lining 1 glued to a centrifugal body 2. As shown in FIG. 2, the wood lining, which is pre-bent in a known manner, is glued directly to the machined surface of a centrifugal body 2. Gluing is carried out using a glue composed of nitrile rubber having phenol, cresol and ketones components (Bostik 1777). Excellent results have been obtained using this glue. The areas milled away at side 7 and side 8, shown in FIG. 3, in the centrifugal body serve to support the return springs, which are not shown in the drawings. Apart from gluing the lining can of course also be attached by other known methods, for example, by screwing or rivetting onto the body. Gluing is preferred for thin frictional linings.

FIG. 3 also shows that the lining is equipped with longitudinal grooves 5 and a lateral groove 4 which permit the oil to run off the lining. A hole 6 is also provided for the flow of oil in a radial direction.

The frictional lining according to the invention can have a thickness (S) of about 0.3 to about 5 mm. If the upper value is exceeded difficulties can occur on bending or the necessary installation space can become too large. If the thickness is less than about 0.3 mm, difficulties often occur in the manufacture of the raw lining. Thinner linings are preferably manufactured from veneer wood. A frictional lining thickness up to about 1% of the diameter of the frictional surface is preferred. A lining thickness of about 0.5 to about 2.5 mm is preferred for use in vehicle transmissions. Linings of this thickness are easy to handle and can be easily and cheaply manufactured from veneer wood. For linings having preferred lining thickness, particularly those of elm wood, longitudinal grooves 5 having a width between about 1 and 2 mm, preferably about 1.5 mm, are particularly suitable. The width of the ribs formed by the longitudinal grooves should be about 2 to about 3 times, preferably about 2.5 times, the groove width. These dimensions give very good results regarding surface pressure and oil throughput. The lining can also be equipped with one or more lateral grooves 4, particularly when the length of the ribs exceeds about 5 cm or a particularly high fluid throughput is necessary. It has been found that a lateral groove width, which is approximately twice the width of the longitudinal grooves, is preferred.

Sliding movement occurs parallel to ribs 3 thereby determining the frictional direction; and for this reason, the wood lining is cut so that the longitudinal direction of its fibres is also substantially parallel to the frictional direction. This is necessary to avoid peeling and splintering of the wood lining.

The formation of the grooves can be carried out either before or after the fastening of the wood lining 1 onto the basic body 2. For industrial production, it is advantageous to manufacture precisely dimensioned and profiled strips or bands which are cut to length and produce individual linings.

Apart from the type of wood linings for centrifugal bodies of centrifugal clutches shown in the diagrams, it is of course possible to apply the frictional linings according to the invention to the inner surface of hollow cylinders, for example, brake bands for automatic vehicle transmissions, or to embody them as disc linings.

I have shown and described embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A frictional lining for a wet clutch or brake comprising a resin-free wood with an average raw density in dried condition (δo) of at least about 550 kilograms per cubic meter, the fibers of the resin-free wood running substantially parallel to the frictional direction of the clutch or brake.

2. The frictional lining according to claim 1, wherein the lining comprises elm wood.

3. The frictional lining according to claim 12, wherein the lining has a thickness of up to about 1% of the frictional diameter.

4. The frictional lining according to claim 1, wherein the lining is manufactured from veneer wood.

5. The frictional lining according to claim 1, wherein the lining is provided with longitudinal grooves extending in the frictional direction, the width of the grooves being between about 1 and 2 mm and the width of ribs formed by the longitudinal grooves being generally 2 to 3 times the width of the longitudinal grooves.

6. The frictional lining according to claim 5, wherein the width of the grooves is about 1.5 mm.

7. The frictional lining according to claim 5 wherein the width of the ribs formed by the longitudinal grooves is about 2.5 times the width of the longitudinal grooves.

8. The frictional lining according to claim 5, wherein the lining has at least one lateral groove whose width is about twice that of the longitudinal grooves.

* * * * *